Figure 1:
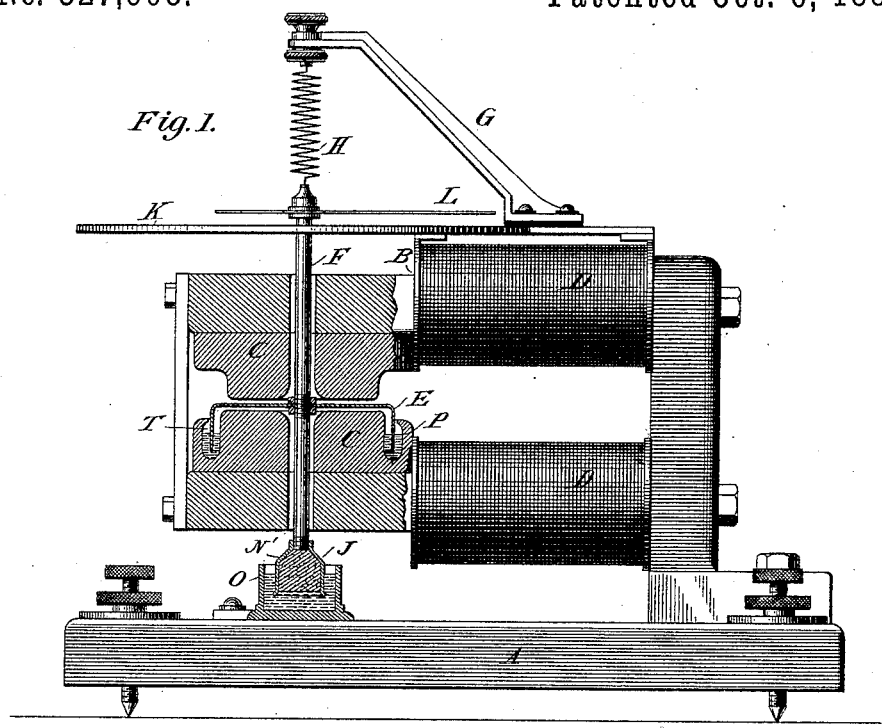

(No Model.) 4 Sheets—Sheet 1.

E. WESTON.
ELECTRICAL MEASURING INSTRUMENT.

No. 327,908. Patented Oct. 6, 1885.

Attest:
Raymond F. Barnes
J. Daniel Compton

Inventor:
Edward Weston
By Parker W. Page
atty.

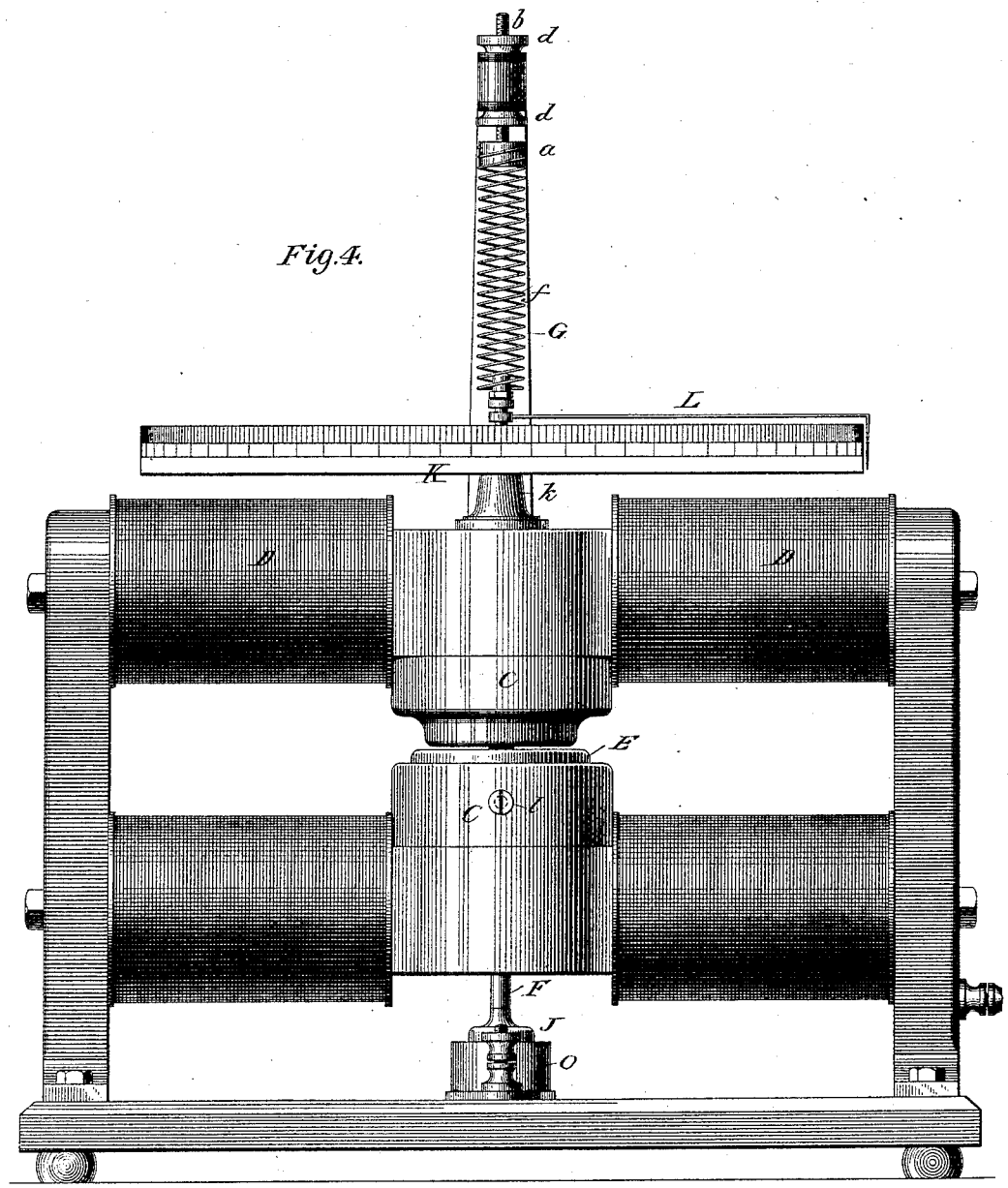

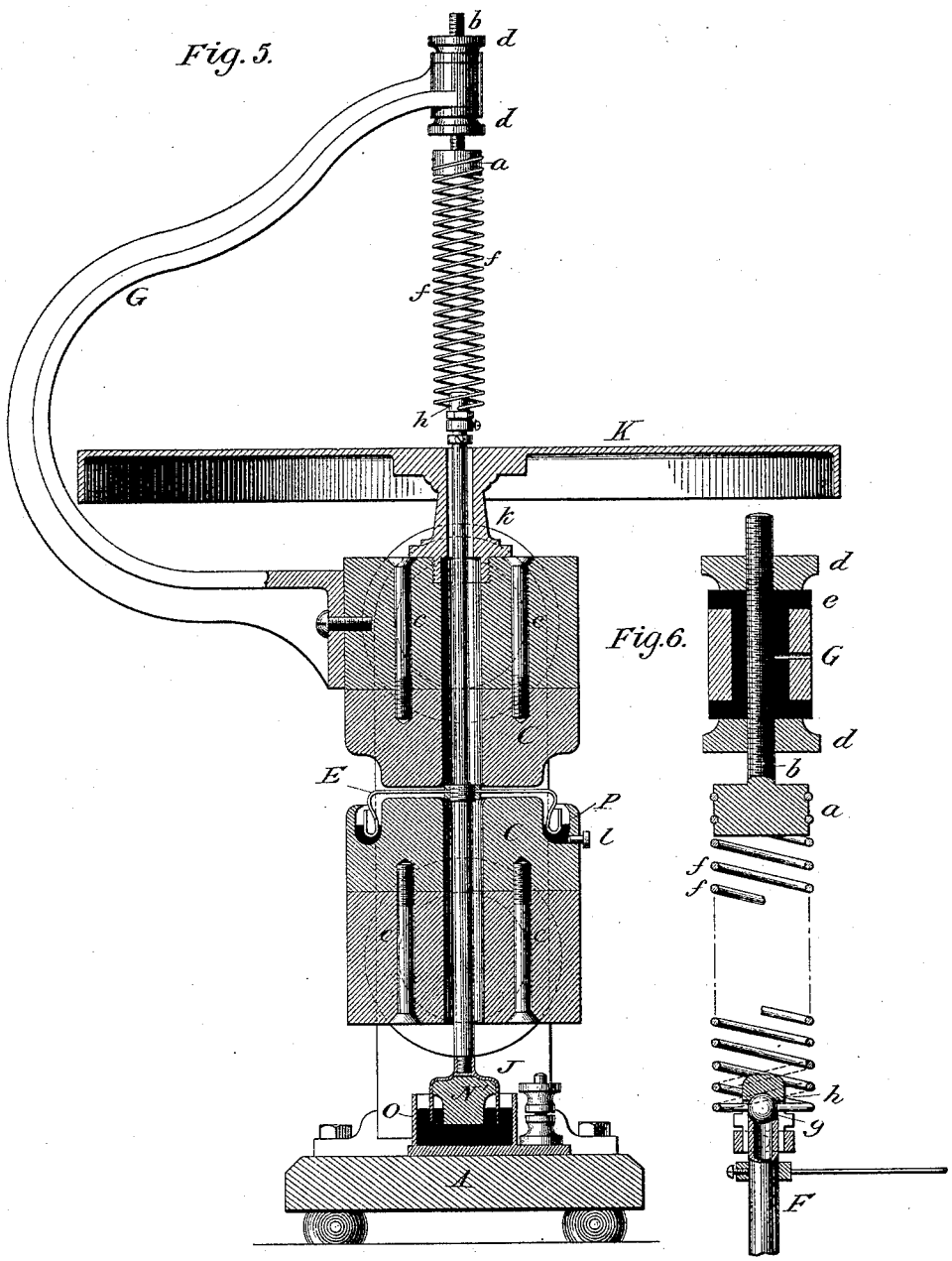

(No Model.) 4 Sheets—Sheet 4.
E. WESTON.
ELECTRICAL MEASURING INSTRUMENT.

No. 327,908. Patented Oct. 6, 1885.

Attest:
Raymond F. Barnes.
Daniel Compton.

Inventor:
Edward Weston
By Parker W. Page
atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRICAL MEASURING-INSTRUMENT.

SPECIFICATION forming part of Letters Patent No. 327,908, dated October 6, 1885.

Application filed May 21, 1885. Serial No. 166,221. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electrical Measuring-Instruments, of which the following is a specification, reference being had to the drawings accompanying and forming a part of the same.

My invention is an improvement in devices commonly called "ammeters"—that is, instruments for the direct determination of the ampères of current passing or flowing in a circuit at any given time.

In defining the general nature and scope of my invention, I would state that I make use of a system of magnets so arranged that a uniform field of force is produced between their opposing pole-pieces, and in this field I mount a conductor for carrying the current to be measured, capable of turning or moving through the field in a direction at right angles to the lines of force. In order to prevent the free movement of the conductor, I connect with it, directly or indirectly, a device for opposing its movement, such as a spiral spring that is distended or compressed by the movement of the conductor, or a spring or like device the torsion of which by the conductor opposes its movement or rotation. Circuit-connections are provided, by means of which the current to be measured is passed through the conductor, and a scale is employed in such relation to the conductor that its movement or change of position will be indicated thereon.

In so far as the essential principle of my invention is concerned, it is immaterial how or in what particular form the movable conductor be made, provided that it be capable of movement across the lines of magnetic force at substantially right angles thereto, and provided that the construction and arrangement of the field and conductor with relation to each other be such that the effect of the field upon the conductor shall be substantially the same for all positions of the latter assumed by it within the working range of the instrument. In illustration of this principle I have shown in the drawings such a measuring apparatus, consisting of a metal disk or plate mounted between two unlike magnetic poles and provided with means whereby a current may be passed through it from center to periphery, or conversely. This disk is suspended by a spiral spring, and carries a pointer that moves over a fixed scale. If, under these circumstances, a current be passed through the disk in a radial direction from center to periphery, or conversely, a tendency to rotate is developed. This tendency is checked and opposed by the twisting of the spring, the opposing force of which increases with the amplitude of the deflection of the disk from its position of rest with no current passing, so that when a current is passed through the disk it assumes a position determined by the strength of the current passing through it—that is to say, such a position that the deflecting power of the current is counterbalanced by the opposing force of the spring. It results from this construction that the deflections indicated on the scale are directly proportional to the strength of the current passing through the disk, since the deflective power which the current exerts upon the disk varies directly as its strength and the opposing force of the spring varies directly as the amplitude of the deflection, and consequently the ampères or units of current strength may be observed directly by the indications of the pointer on the scale without any computation. This has long been considered a very desirable result, and many attempts have been made to attain it by various devices and combinations; but so far as I am aware it has not hitherto been obtained, except in a very imperfect way and with a comparatively limited range, and an efficient angular deflection of the needle or index confined to a comparatively small part of the circle. In my instrument, when properly constructed, the deflections are strictly proportional to the current strength. The instrument has a very wide range, limited only by the carrying-power of the disk and its electrical connections, and the resilience of the spring and the efficient angular deflection extends not only entirely around the circle, but several times around, being limited only by the capacity of the opposing spring to twist without receiving a permanent set.

In the drawings hereto annexed the principle of the construction of the apparatus embodying my invention, the more important modifications, and various details of construction are illustrated.

Figure 2:
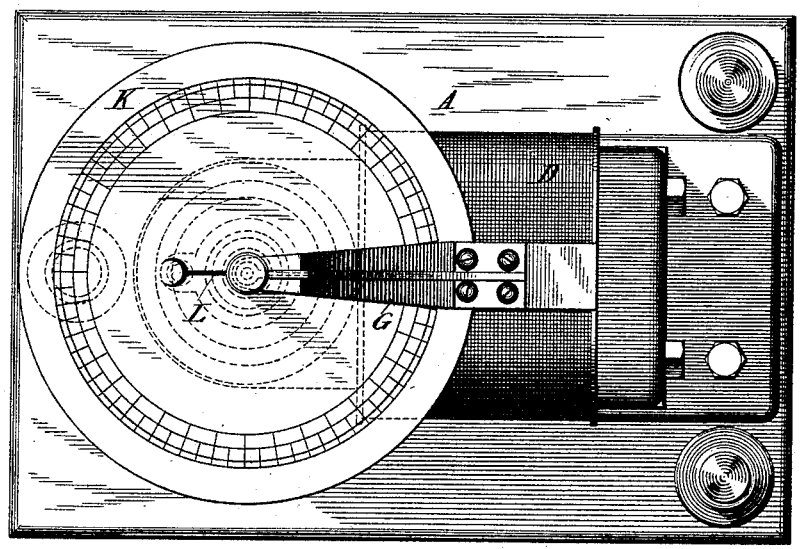
Figure 3:
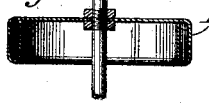
Figure 7:
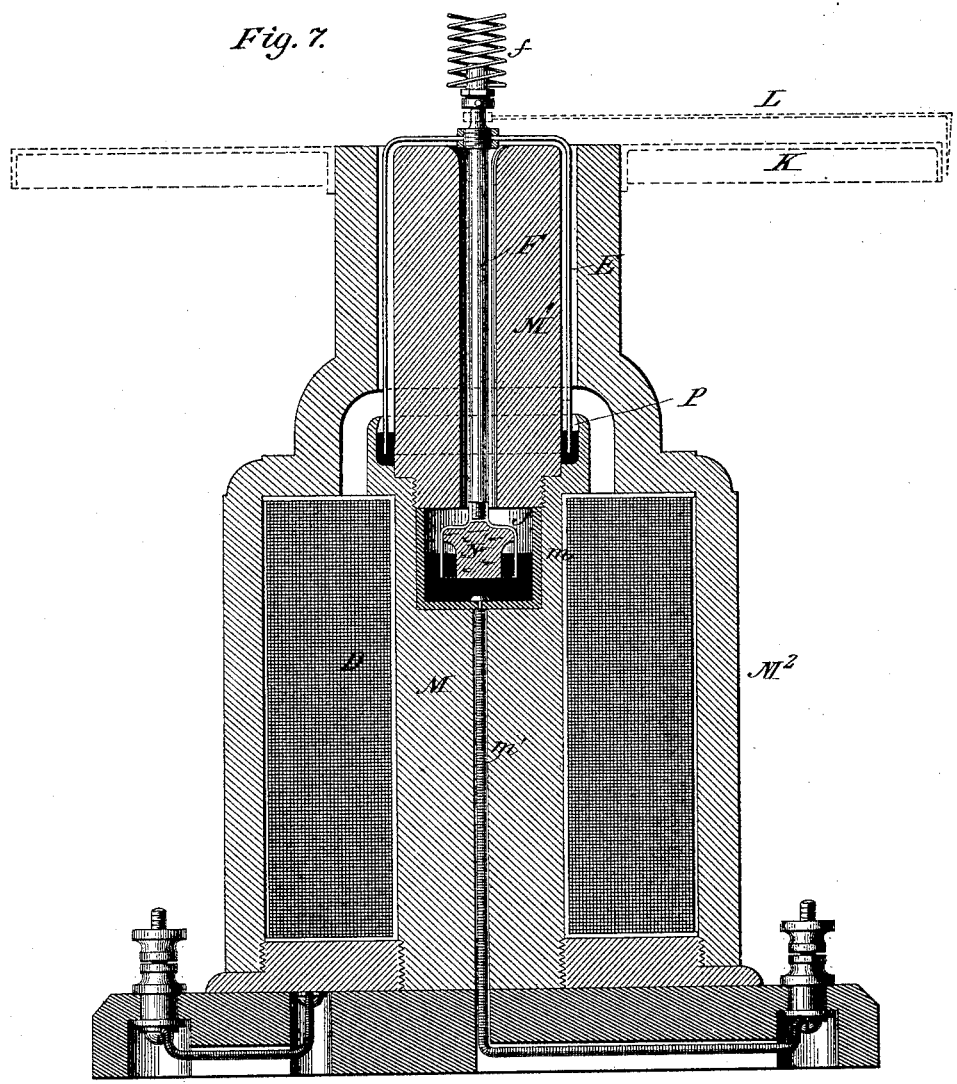

Figure 1 is a view of a simple form of device partly in side elevation and partly in section. Fig. 2 is a top plan view of the same; Fig. 3, a section of a modified form of disk or conductor. Fig. 4 is a side elevation of an apparatus with a modified form of magnetic field. Fig. 5 is a vertical cross-section of Fig. 4, showing in detail the plan of construction. Fig. 6 is an enlarged detail in section of the device for supporting the conductor or disk. Fig. 7 is a vertical sectional view of another modification.

Referring to Figs. 1 and 2, this apparatus is mounted on an adjustable stand, A, similar to that commonly used for such instruments.

B B are the cores of any proper arrangement or system of electro-magnets, having two pole-pieces of unlike polarity, C C, between which the rotating conductor is mounted. The cores are wound with coils D D.

Between the pole-pieces C C is a non-magnetic conducting-disk, E, on a spindle, F. The spindle passes through the pole-pieces and is suspended from a rigid arm, G, by a spiral spring, H, and carries a pointer, L, that sweeps over a graduated scale, K.

The moving parts, including the disk, spindle, and pointer, are made as light as practicable, and to still further lessen the weight on spring H, the spindle carries a steel cup, J, at its lower end, in which is a cork, N', or some light substance. This cup extends into a receptacle, O, which is filled with mercury when the apparatus is in use. The purpose of the cork filling is to sustain the weight of the moving parts by its buoyancy in the mercury.

The lower pole-piece C contains an annular groove or recess, P, and the edge of the disk E is bent over or provided with a flange, T, that enters this groove. When the instrument is to be used, this groove is partially filled with mercury. The flange, therefore, should be of platinum, or coated with platinum or some similar metal, in order that it may not be attacked by the mercury.

As another means of lessening the weight upon the spindle H, I sometimes turn up the edge of the disk, as shown in Fig. 3, forming a hollow flange, which dips into the mercury in the annular chamber.

In Figs. 4 to 6 a better and more practicable construction of the apparatus is shown. In this case a system of magnets is used that form consequent poles of opposite polarity in the pole-pieces C C. These pole-pieces are secured to the cores of the magnets by screw-bolts $c\ c$, but in other respects their construction and operation is the same as in the previously-described form of apparatus. I prefer, also, to secure the arm G to the core or pole-piece of the upper magnet, and to cast the dial or graduated plate K with a stand, $k$, that is screwed into the core of the upper magnet, or otherwise suitably secured thereto.

The device for suspending the disk or conductor E from the arm G is as follows: A head, $a$, with a screw-stem, $b$, is secured by the clamping-nuts $d\ d$ to an insulating-block, $e$, that is carried by the arm G. To the head $a$ are secured two springs, $f\ f$. These springs at their lower extremities are attached to or carry in any suitable manner a ball, $g$, around which is a socket, $h$, that forms a head, by means of which the tube or spindle F is supported. A universal joint is thus formed, by means of which the spindle is held in proper alignment.

In the side of the lower pole-piece C a hole is drilled extending into the mercury groove or chamber. The hole is closed by a plug or screw, $l$, which may be withdrawn to draw off the mercury, when so desired, without tipping the instrument.

Fig. 7 shows an apparatus in which the conductor is in the form of a cylinder. To better adapt the field to this form of conductor, I use a central core, M, surrounded by a coil, D, and an inclosing-shell of soft iron, $M^2$. The upper end of the core M is recessed, and above the coil is increased in diameter. The portion bored out is also of greater diameter in the enlarged part of the core.

In the bottom of the recess is fitted an insulating-cup, $m$, forming a receptacle for mercury, with which an insulated wire, $m'$, is brought into contact through a passage in the core.

An extension, M', of the core M, and of about the same diameter, is adapted to be screwed to the latter, as shown, thus leaving an annular chamber, P, for containing mercury. Through the part M' of the core extends the spindle F, supported in the manner hereinbefore described, and provided with the steel cup J that dips into the mercury in the cup $m$, and a pointer or needle, L, that sweeps over the scale on disk K. In lieu of the flat disk, however, the spindle carries a cylinder of copper or like metal, the edge or rim of which dips into the mercury in the chamber P. The portion of the cylinder in contact with the mercury should be either of platinum or coated with some suitable metal, so as not to be affected by the mercury.

To produce a strong magnetic field, the shell or casing $M^2$ is extended above the coil to the top of the extension M' of the core. As the shell forms one pole and the core another, a strong magnetic field is thus produced.

The principle and mode of operation are as follows: The disk or its equivalent, E, being suspended in a magnetic field is moved by a current flowing from its center to periphery, or conversely. This movement is across the lines of force and at right angles thereto, and is opposed by the spring by which the disk is suspended. For accomplishing this, proper circuit-connections are provided in all the instruments shown herein—that is to say, one terminal is connected to the mercury-chamber O and the other to the recess P—so that the current will pass by the spindle to the center of the disk, thence to its periphery and the mercury in the chamber P, and so to the opposite terminal. The movement in a given field, which the current through the disk effects, will be proportional to the strength of the current when opposed by a device—such as a torsion-spring or any of the similar means used for like purposes—in which the opposing force increases in proportion to the deflection. So, therefore, if the winding of the field-coils and the strength of the existing current be such that the magnetic intensity of the field is practically uniform, the deflection of the disk, and consequently of the pointer, will indicate the units of current strength flowing in the circuit at the time; or, in other words, the number of ampères. Since this instrument is primarily designed as an ammeter, I use a current for energizing the field-magnets of such strength, or use coils of such character, that the field is practically saturated and secure uniformity of magnetic intensity in this way. It is, however, obvious that the instrument would be a true indicator of the current energy expended, if the field-magnets, in lieu of being saturated, were considerably below this point, and the field-coils were placed in a cross or derived circuit, so that the magnetic intensity of the field would vary in proportion to the electro-motive force of the circuit.

In using the instrument the current to be measured is passed through the disk or its equivalent, and the field-magnet coils may be included in a cross or branch circuit from the same generator, or they may be included in the circuit of a battery or any other suitable generator, or they may be included in the main circuit, provided the exciting coils be so proportioned that the field is saturated.

With reference to the advantages which certain special details of the construction hereinbefore set forth secure, I would state that I attach special importance to the means for applying and securing the pole-pieces, as it enables me to construct the device at a greatly reduced cost. The double spiral spring for suspending the disk is also an important feature, as it is much more readily secured to the point of support and to the disk or the connection secured thereto. I have also shown two forms of indicator-plate, one having the scale on its upper face, the other with a scale on the face of a flange. A great many other forms of dial or scale may be used.

With reference to the general nature of the apparatus and to the characteristics which specially adapt it to the purpose set forth, it is to be observed that the results are secured by using a conductor that moves in a magnetic field across the lines of force at substantially right angles thereto against an opposing force—such as a torsion-spring—so that the main objects of the invention would be secured not only by a disk or cylinder, but by many other forms of conductor, with proper provisions made for passing the current through them, and thus deflecting them to different positions in the field. As an illustration of this, regarding the disk or cylinder as composed of an infinite number of radial or parallel conductors, it is obvious that there may be radial divisions or insulating spaces or not in the disk or cylinder without materially affecting the result, and that the result obtained by passing the current through all of them would be also obtained in using any number less than the whole. The form of conductor which I prefer, however, is that of a disk. This is not only a simple and cheap form, but it possesses the additional advantages that it is capable of carrying a very heavy current, and may have a large surface in contact with the mercury into which its periphery dips. A further advantage results from the fact that while it is almost impossible to obtain an absolutely uniform field, the disk from its position in the field compensates for slight inequalities of magnetic intensity therein.

The instrument may be used in any position and the earth's magnetism entirely disregarded, as the artificial field is so very much more intense that no effects of terrestial magnetism are discernable.

It is also to be observed that the effect of the field upon the moving conductor is substantially the same for all positions of the conductor within the field, and this may be attained in apparatus constructed in various different ways. I have shown but a few of these; but there are many others which would be equally included in my invention. It follows from this that the field itself—that is, the distribution of the lines of force—should be as nearly uniform as possible in order to secure accurate results.

What I claim is—

1. The combination, with the opposed poles of a magnetic system, of a conductor mounted to rotate or move across the lines of magnetic force at substantially right angles thereto, means for opposing the movement of the conductor, and a scale for indicating its change of position or the current units corresponding thereto.

2. The combination, with a practically uniform magnetic field, of a conductor mounted to rotate or move across the lines of force at substantially right angles thereto, means for passing a current through the conductor, a spring connected with the conductor for opposing its movement, and a scale for indicating its change of position or the units of current corresponding thereto.

3. The combination, with the opposing poles of a magnetic system, of a conducting-disk or its equivalent suspended or supported between said poles, so as to rotate or turn about its center, electrical connections for passing a current radially through the disk, a spring for opposing the movement of the disk, and a scale for indicating its change of position or the units of current corresponding thereto.

4. The combination, with the opposing poles of a magnetic system, of a conducting-disk secured to a spindle extending centrally through the poles, a spring-support for the spindle, electrical connections for passing an electric current radially through the disk, and a pointer and scale for indicating the change of position of the disk, as set forth.

5. The combination, with the opposing poles of a magnetic system, one containing an annular groove or recess for holding a fluid-conductor, of a conducting-disk having a flange that extends into the annular groove, the disk being suspended or supported so as to rotate or turn in the magnetic field in a plane cutting the lines of force, a spring or springs for opposing the movement of the disk, and a pointer and scale for indicating its change of position or the units of current corresponding thereto.

6. The combination, with opposing magnetic poles, of a spindle extending centrally through them and carrying at its end a metal cup containing a light substance—such as cork—a mercury-receptacle into which the said cup extends, a torsion spring or springs by which the spindle is suspended or supported, a conducting-disk on the spindle and between the magnetic poles, an annular mercury-chamber in one of the poles, into which the periphery of the disk extends, and a pointer and scale for indicating the change of position of the disk or the units of current corresponding thereto.

7. The combination, with opposed magnetic poles, of a conductor arranged to rotate or turn about a center in a direction at substantially right angles to the lines of force through which it moves, a device for opposing the movement or rotation of the conductor, and a pointer and scale for indicating the change of position of the same or the current-units corresponding thereto.

8. The combination, with the poles of a magnetic system, of a conductor supported in the field produced by the same, an arm secured to one of the poles, a torsional spring connection between the arm and the conductor, and circuit connections for passing a current from the center to the end or edge of the conductor, or conversely, as set forth.

9. The combination, with opposed magnetic poles, of a conductor arranged to rotate or turn about a center in a direction at substantially right angles to the lines of force through which it moves, a spindle carrying the conductor and passing through the poles, and a support for said spindle, consisting of two torsion-springs secured to a stationary or adjustable head, as set forth.

10. The combination, with the conductor in a magnetic field, of a spindle carrying said conductor, torsion-springs secured to a stationary or adjustable head, and a universal joint between the springs and the spindle, as set forth.

11. The combination, with the cores of a magnetic system and iron pole-pieces bolted to the cores and formed one with a flat end, the other with a circular groove or recess, of a conductor supported or suspended between the poles and a device for opposing its rotation, as and for the purposes specified.

12. The combination, with the opposing poles of a magnetic system, one formed with a flat end the other with a circular groove or recess in its end and provided with an aperture or tap-hole for drawing off the fluids that may be placed in the said recess, of a flanged disk supported or suspended between the poles and means for opposing its rotation, all as set forth.

EDWARD WESTON.

Witnesses:
RICHARD WM. BLOEMEKE,
F. N. CRANE.